US007826681B2

(12) United States Patent
Kerofsky et al.

(10) Patent No.: US 7,826,681 B2
(45) Date of Patent: Nov. 2, 2010

(54) METHODS AND SYSTEMS FOR SURROUND-SPECIFIC DISPLAY MODELING

(75) Inventors: Louis Joseph Kerofsky, Camas, WA (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 910 days.

(21) Appl. No.: 11/680,539

(22) Filed: Feb. 28, 2007

(65) Prior Publication Data

US 2008/0208551 A1 Aug. 28, 2008

(51) Int. Cl.
*G06K 9/36* (2006.01)

(52) U.S. Cl. ........................................ 382/274; 345/102

(58) Field of Classification Search ....................... None
See application file for complete search history.

(56) References Cited

U.S. PATENT DOCUMENTS

| | | | |
|---|---|---|---|
| 4,020,462 | A | 4/1977 | Morrin |
| 4,196,452 | A | 4/1980 | Warren et al. |
| 4,223,340 | A | 9/1980 | Bingham et al. |
| 4,268,864 | A | 5/1981 | Green |
| 4,399,461 | A | 8/1983 | Powell |
| 4,402,006 | A | 8/1983 | Karlock |
| 4,523,230 | A | 6/1985 | Carlson et al. |
| 4,536,796 | A | 8/1985 | Harlan |
| 4,549,212 | A | 10/1985 | Bayer |
| 4,553,165 | A | 11/1985 | Bayer |
| 4,709,262 | A | 11/1987 | Spieth |
| 4,847,603 | A | 7/1989 | Blanchard |
| 4,962,426 | A | 10/1990 | Naoi et al. |
| 5,025,312 | A | 6/1991 | Faroudja |
| 5,046,834 | A | 9/1991 | Dietrich |
| 5,081,529 | A | 1/1992 | Collette |
| 5,176,224 | A | 1/1993 | Spector |
| 5,218,649 | A | 6/1993 | Kundu et al. |
| 5,227,869 | A | 7/1993 | Degawa |
| 5,235,434 | A | 8/1993 | Wober |
| 5,260,791 | A | 11/1993 | Lubin |
| 5,270,818 | A | 12/1993 | Ottenstein |
| 5,389,978 | A | 2/1995 | Jeong-Hun |
| 5,526,446 | A | 6/1996 | Adelson |
| 5,528,257 | A | 6/1996 | Okumura et al. |

(Continued)

FOREIGN PATENT DOCUMENTS

| | | |
|---|---|---|
| EP | 0841652 | 5/1998 |

(Continued)

OTHER PUBLICATIONS

U.S. Appl. No. 11/564,203—Non-final Office Action dated Sep. 24, 2009.

(Continued)

*Primary Examiner*—Brian P Werner
(74) *Attorney, Agent, or Firm*—Chernoff, Vilhauer, McClung & Stenzel

(57) ABSTRACT

Embodiments of the present invention comprise systems and methods for surround-specific display modeling in which the brightness of a display is varied based on a perceptual brightness model that is expressed as a function of the illumination level that surrounds a display as it is being perceived by a viewer.

18 Claims, 4 Drawing Sheets

U.S. PATENT DOCUMENTS

| | | | | |
|---|---|---|---|---|
| 5,541,028 | A | 7/1996 | Lee et al. | |
| 5,650,942 | A | 7/1997 | Granger | |
| 5,651,078 | A | 7/1997 | Chan | |
| 5,696,852 | A | 12/1997 | Minoura et al. | |
| 5,857,033 | A | 1/1999 | Kim | |
| 5,912,992 | A | 6/1999 | Sawanda et al. | |
| 5,920,653 | A | 7/1999 | Silverstein | |
| 5,952,992 | A | 9/1999 | Helms | |
| 5,956,014 | A | 9/1999 | Kuriyama | |
| 6,055,340 | A | 4/2000 | Nagao | |
| 6,075,563 | A | 6/2000 | Hung | |
| 6,275,207 | B1 | 8/2001 | Nitta et al. | |
| 6,278,421 | B1 | 8/2001 | Ishida | |
| 6,285,798 | B1 | 9/2001 | Lee | |
| 6,317,521 | B1 | 11/2001 | Gallagher | |
| 6,424,730 | B1 | 7/2002 | Wang et al. | |
| 6,445,835 | B1 | 9/2002 | Qian | |
| 6,504,953 | B1 | 1/2003 | Behrends | |
| 6,507,668 | B1 | 1/2003 | Park | |
| 6,516,100 | B1 | 2/2003 | Qian | |
| 6,546,741 | B2 | 4/2003 | Yun | |
| 6,560,018 | B1 | 5/2003 | Swanson | |
| 6,573,961 | B2 | 6/2003 | Jiang et al. | |
| 6,583,579 | B2 | 6/2003 | Tsumura | |
| 6,593,934 | B1 | 7/2003 | Liaw et al. | |
| 6,594,388 | B1 | 7/2003 | Gindele et al. | |
| 6,600,470 | B1 | 7/2003 | Tsuda | |
| 6,618,042 | B1 | 9/2003 | Powell | |
| 6,618,045 | B1 | 9/2003 | Lin | |
| 6,628,823 | B1 | 9/2003 | Holm | |
| 6,677,959 | B1 | 1/2004 | James | |
| 6,728,416 | B1 | 4/2004 | Gallagher | |
| 6,753,835 | B1 | 6/2004 | Sakai | |
| 6,778,691 | B1 | 8/2004 | Barski et al. | |
| 6,782,137 | B1 | 8/2004 | Avinash | |
| 6,788,280 | B2 | 9/2004 | Ham | |
| 6,795,063 | B2 | 9/2004 | Endo et al. | |
| 6,809,717 | B2 | 10/2004 | Asao et al. | |
| 6,809,718 | B2 | 10/2004 | Wei et al. | |
| 6,816,141 | B1 | 11/2004 | Fergason | |
| 6,934,772 | B2 | 8/2005 | Bui et al. | |
| 7,006,688 | B2 | 2/2006 | Zaklika et al. | |
| 7,010,160 | B1 | 3/2006 | Yoshida | |
| 7,068,328 | B1 | 6/2006 | Mino | |
| 7,088,388 | B2 | 8/2006 | MacLean et al. | |
| 7,098,927 | B2 | 8/2006 | Daly et al. | |
| 7,110,062 | B1 | 9/2006 | Whitted et al. | |
| 7,142,218 | B2 | 11/2006 | Yoshida | |
| 7,158,686 | B2 | 1/2007 | Gindele | |
| 7,199,776 | B2 | 4/2007 | Ikeda et al. | |
| 7,202,458 | B2 | 4/2007 | Park | |
| 7,221,408 | B2 | 5/2007 | Kim | |
| 7,259,769 | B2 | 8/2007 | Diefenbaugh | |
| 7,287,860 | B2 | 10/2007 | Yoshida et al. | |
| 7,289,154 | B2 | 10/2007 | Gindele | |
| 7,330,287 | B2 | 2/2008 | Sharman | |
| 7,352,347 | B2 | 4/2008 | Fergason | |
| 7,403,318 | B2 | 7/2008 | Miyazawa et al. | |
| 7,433,096 | B2 | 10/2008 | Chase et al. | |
| 7,532,239 | B2 | 5/2009 | Hayaishi | |
| 7,564,438 | B2 | 7/2009 | Kao et al. | |
| 7,639,220 | B2 | 12/2009 | Yoshida et al. | |
| 2001/0031084 | A1 | 10/2001 | Cannata et al. | |
| 2002/0008784 | A1 | 1/2002 | Shirata et al. | |
| 2002/0057238 | A1 | 5/2002 | Nitta | |
| 2002/0167629 | A1 | 11/2002 | Blanchard | |
| 2002/0181797 | A1 | 12/2002 | Young | |
| 2003/0001815 | A1 | 1/2003 | Cui | |
| 2003/0012437 | A1 | 1/2003 | Zaklika et al. | |
| 2003/0051179 | A1 | 3/2003 | Tsirkel | |
| 2003/0053690 | A1 | 3/2003 | Trifonov | |
| 2003/0058464 | A1 | 3/2003 | Loveridge et al. | |
| 2003/0146919 | A1 | 8/2003 | Kawashima | |
| 2003/0169248 | A1 | 9/2003 | Kim | |
| 2003/0179213 | A1 | 9/2003 | Liu | |
| 2003/0193472 | A1 | 10/2003 | Powell | |
| 2003/0201968 | A1 | 10/2003 | Itoh | |
| 2003/0223634 | A1 | 12/2003 | Gallagher et al. | |
| 2003/0227577 | A1 | 12/2003 | Allen et al. | |
| 2003/0235342 | A1 | 12/2003 | Gindele | |
| 2004/0001184 | A1 | 1/2004 | Gibbons | |
| 2004/0081363 | A1 | 4/2004 | Gindele et al. | |
| 2004/0095531 | A1 | 5/2004 | Jiang et al. | |
| 2004/0113905 | A1 | 6/2004 | Mori et al. | |
| 2004/0113906 | A1 | 6/2004 | Lew | |
| 2004/0119950 | A1 | 6/2004 | Penn | |
| 2004/0130556 | A1 | 7/2004 | Nokiyama | |
| 2004/0160435 | A1 | 8/2004 | Cui | |
| 2004/0170316 | A1 | 9/2004 | Saquib | |
| 2004/0198468 | A1 | 10/2004 | Patel et al. | |
| 2004/0201562 | A1 | 10/2004 | Funamoto | |
| 2004/0207609 | A1 | 10/2004 | Hata | |
| 2004/0207635 | A1 | 10/2004 | Miller | |
| 2004/0208363 | A1 | 10/2004 | Berge et al. | |
| 2004/0239612 | A1 | 12/2004 | Asao | |
| 2004/0257324 | A1 | 12/2004 | Hsu | |
| 2005/0001801 | A1 | 1/2005 | Kim | |
| 2005/0057484 | A1 | 3/2005 | Diefenbaugh | |
| 2005/0104839 | A1 | 5/2005 | Baik | |
| 2005/0104840 | A1 | 5/2005 | Sohn | |
| 2005/0117186 | A1 | 6/2005 | Li et al. | |
| 2005/0117798 | A1 | 6/2005 | Patton et al. | |
| 2005/0140639 | A1 | 6/2005 | Oh et al. | |
| 2005/0147317 | A1 | 7/2005 | Daly et al. | |
| 2005/0152614 | A1 | 7/2005 | Daly et al. | |
| 2005/0184952 | A1 * | 8/2005 | Konno et al. | 345/102 |
| 2005/0190142 | A1 | 9/2005 | Ferguson | |
| 2005/0195212 | A1 | 9/2005 | Kurumisawa | |
| 2005/0200868 | A1 | 9/2005 | Yoshida | |
| 2005/0232482 | A1 | 10/2005 | Ikeda et al. | |
| 2005/0244053 | A1 | 11/2005 | Hayaishi | |
| 2005/0248503 | A1 | 11/2005 | Schobben et al. | |
| 2005/0248593 | A1 | 11/2005 | Feng et al. | |
| 2006/0001641 | A1 | 1/2006 | Degwekar et al. | |
| 2006/0012987 | A9 | 1/2006 | Ducharme et al. | |
| 2006/0015758 | A1 | 1/2006 | Yoon | |
| 2006/0061563 | A1 | 3/2006 | Fleck | |
| 2006/0072158 | A1 | 4/2006 | Christie | |
| 2006/0077405 | A1 | 4/2006 | Topfer et al. | |
| 2006/0119612 | A1 | 6/2006 | Kerofsky | |
| 2006/0119613 | A1 | 6/2006 | Kerofsky | |
| 2006/0120489 | A1 | 6/2006 | Lee | |
| 2006/0146236 | A1 | 7/2006 | Wu et al. | |
| 2006/0174105 | A1 | 8/2006 | Park | |
| 2006/0209003 | A1 | 9/2006 | Kerofsky | |
| 2006/0209005 | A1 | 9/2006 | Pedram et al. | |
| 2006/0221046 | A1 | 10/2006 | Sato | |
| 2006/0238827 | A1 | 10/2006 | Ikeda | |
| 2006/0256840 | A1 | 11/2006 | Alt | |
| 2006/0262111 | A1 | 11/2006 | Kerofsky | |
| 2006/0267923 | A1 | 11/2006 | Kerofsky | |
| 2006/0284822 | A1 | 12/2006 | Kerofsky | |
| 2006/0284823 | A1 | 12/2006 | Kerofsky | |
| 2006/0284882 | A1 | 12/2006 | Kerofsky | |
| 2007/0002004 | A1 | 1/2007 | Woo | |
| 2007/0035565 | A1 | 2/2007 | Kerofsky | |
| 2007/0092139 | A1 | 4/2007 | Kerofsky | |
| 2007/0097069 | A1 | 5/2007 | Kurokawa | |
| 2007/0103418 | A1 | 5/2007 | Ogino | |
| 2007/0126757 | A1 | 6/2007 | Itoh | |
| 2007/0146236 | A1 | 6/2007 | Kerofsky et al. | |
| 2007/0211049 | A1 | 9/2007 | Kerofsky | |
| 2007/0268524 | A1 | 11/2007 | Nose | |
| 2008/0024517 | A1 * | 1/2008 | Kerofsky | 345/600 |

| | | | |
|---|---|---|---|
| 2008/0037867 A1 | 2/2008 | Lee |
| 2008/0074372 A1 | 3/2008 | Baba |
| 2008/0094426 A1 | 4/2008 | Kimpe |
| 2008/0180373 A1 | 7/2008 | Mori |
| 2008/0231581 A1 | 9/2008 | Fujine |
| 2009/0002285 A1 | 1/2009 | Baba |
| 2009/0051714 A1 | 2/2009 | Ohhara |

FOREIGN PATENT DOCUMENTS

| | | |
|---|---|---|
| EP | 963112 | 12/1999 |
| FR | 2782566 | 2/2000 |
| JP | 3102579 | 4/1991 |
| JP | 3284791 | 12/1991 |
| JP | 8009154 | 1/1996 |
| JP | 11194317 | 7/1999 |
| JP | 200056738 | 2/2000 |
| JP | 2000148072 | 5/2000 |
| JP | 2000259118 | 9/2000 |
| JP | 2001057650 | 2/2001 |
| JP | 2001083940 | 3/2001 |
| JP | 2001086393 | 3/2001 |
| JP | 2001298631 | 10/2001 |
| JP | 2002189450 | 7/2002 |
| JP | 2003259383 | 9/2003 |
| JP | 2003271106 | 9/2003 |
| JP | 2003316318 | 11/2003 |
| JP | 2004007076 | 1/2004 |
| JP | 200445634 | 2/2004 |
| JP | 2004133577 | 4/2004 |
| JP | 2004177547 | 6/2004 |
| JP | 2004272156 | 9/2004 |
| JP | 2004287420 | 10/2004 |
| JP | 2004325628 | 11/2004 |
| JP | 2005346032 | 12/2005 |
| JP | 2006042191 | 2/2006 |
| JP | 2006317757 | 11/2006 |
| JP | 2007093990 | 4/2007 |
| JP | 2007212628 | 8/2007 |
| JP | 2007272023 | 10/2007 |
| JP | 2007299001 | 11/2007 |
| WO | WO9609717 A1 | 3/1996 |
| WO | WO02099557 | 12/2002 |
| WO | WO03039137 | 5/2003 |
| WO | WO2004075155 | 9/2004 |
| WO | WO2005029459 | 3/2005 |

OTHER PUBLICATIONS

U.S. Appl. No. 11/154,052—Non-final Office Action dated Nov. 10, 2009.
U.S. Appl. No. 11/154,054—Final Office Action dated Jun. 24, 2009.
U.S. Appl. No. 11/154,053—Non-final Office Action dated Jul. 23, 2009.
U.S. Appl. No. 11/202,903—Non-final Office Action dated Aug. 7, 2009.
U.S. Appl. No. 11/202,903—Final Office Action dated Dec. 28, 2009.
U.S. Appl. No. 11/224,792—Non-final Office Action dated Nov. 18, 2009.
U.S. Appl. No. 11/371,466—Non-final Office Action dated Dec. 14, 2009.
U.S. Appl. No. 11/154,054—Non-final Office Action dated Jan. 7, 2009.
U.S. Appl. No. 11/293,562—Non-final Office Action dated Jan. 7, 2009.
International Application No. PCT/US05/043560 International Search Report.
International Application No. PCT/US05/043560 International Preliminary Examination Report.
International Application No. PCT/US05/043641 International Search Report.
International Application No. PCT/US05/043641 International Preliminary Examination Report.
International Application No. PCT/US05/043647 International Search Report.
International Application No. PCT/US05/043647 International Preliminary Examination Report.
International Application No. PCT/US05/043640 International Search Report.
International Application No. PCT/US05/043640 International Preliminary Examination Report.
International Application No. PCT/US05/043646 International Preliminary Examination Report.
International Application No. PCT/US05/043646 International Search Report.
U.S. Appl. No. 11/154,054—Office Action dated Mar. 25, 2008.
U.S. Appl. No. 11/293,066—Office Action dated Jan. 15, 2008.
U.S. Appl. No. 11/371,466—Office Action dated Oct. 5, 2007.
U.S. Appl. No. 11/371,466—Office Action dated Apr. 11, 2008.
Wei-Chung Cheng and Massoud Pedram, "Power Minimization in a Backlit TFT-LCD Display by Concurrent Brightness and Contrast Scaling" IEEE Transactions on Consumer Electronics, vol. 50, No. 1, Feb. 2004.
Insun Hwang, Cheol Woo Park, Sung Chul Kang and Dong Sik Sakong, "Image Synchronized Brightness Control" SID Symposium Digest 32, 492 (2001).
Inseok Choi, Hojun Shim and Naehyuck Chang, "Low-Power Color TFT LCD Display for Hand-Held Embedded Systems", In ISLPED, 2002.
A. Iranli, H. Fatemi, and M. Pedram, "HEBS: Histogram equalization for backlight scaling," Proc. of Design Automation and Test in Europe, Mar. 2005, pp. 346-351.
Chang, N., Choi, I., and Shim, H. 2004. DLS: dynamic backlight luminance scaling of liquid crystal display. IEEE Trans. Very Large Scale Integr. Syst. 12, 8 (Aug. 2004), 837-846.
S. Pasricha, M Luthra, S. Mohapatra, N. Dutt, N. Venkatasubramanian,"Dynamic Backlight Adaptation for Low Power Handheld Devices," To appear in IEEE Design and Test (IEEE D&T), Special Issue on Embedded Systems for Real Time Embedded Systems, Sep. 8, 2004.
H. Shim, N. Chang, and M. Pedram, "A backlight power management framework for the battery-operated multi-media systems." IEEE Design and Test Magazine, Sep./Oct. 2004, pp. 388-396.
F. Gatti, A. Acquaviva, L. Benini, B. Ricco', "Low-Power Control Techniques for TFT LCD Displays," Compiler, Architectures and Synthesis of Embedded Systems, Oct. 2002.
Ki-Duk Kim, Sung-Ho Baik, Min-Ho Sohn, Jae-Kyung Yoon, Eui-Yeol Oh and In-Jae Chung, "Adaptive Dynamic Image Control for IPS-Mode LCD TV", SID Symposium Digest 35, 1548 (2004).
Raman and Hekstra, "Content Based Contrast Enhancement for Liquid Crystal Displays with Backlight Modulation", IEEE Transactions on Consumer Electronics, vol. 51, No. 1, Feb. 2005.
E.Y. Oh, S. H. Balik, M. H. Sohn, K. D. Kim, H. J. Hong, J.Y. Bang, K.J. Kwon, M.H. Kim, H. Jang, J.K. Yoon and I.J. Chung, "IPS-mode dynamic LCD-TV realization with low black luminance and high contrast by adaptive dynamic image control technology", Journal of Society for Information Display, Mar. 2005, vol. 13, Issue 3, pp. 181-266.
Fabritus, Grigore, Muang, Loukusa, Mikkonen, "Towards energy aware system design", Online via Nokia (http://www.nokia.com/nokia/0,,53712,00.html).
Choi, I., Kim, H.S., Shin, H. and Chang, N. "LPBP: Low-power basis profile of the Java 2 micro edition" In Proceedings of the 2003 International Symposium on Low Power Electronics and Design (Seoul, Korea, Aug. 2003) ISLPED '03. ACM Press, New York, NY, p. 36-39.
A. Iranli, W. Lee, and M. Pedram, "HVS-Aware Dynamic Backlight Scaling in TFT LCD's", Very Large Scale Integration (VLSI) Systems, IEEE Transactions vol. 14 No. 10, pp. 1103-1116, 2006.
L. Kerofsky and S. Daly "Brightness preservation for LCD backlight reduction" SID Symposium Digest vol. 37, 1242-1245 (2006).
L. Kerofsky and S. Daly "Addressing Color in brightness preservation for LCD backlight reduction" ADEAC 2006 pp. 159-162.
L. Kerofsky "LCD Backlight Selection through Distortion Minimization", IDW 2007 pp. 315-318.

International Application No. PCT/JP08/053895 International Search Report.
U.S. Appl. No. 11/154,054—Office Action dated Aug. 5, 2008.
U.S. Appl. No. 11/460,940—Office Action dated Aug. 7, 2008.
International Application No. PCT/JP08/064669 International Search Report.
Richard J. Qian, et al, "Image Retrieval Using Blob Histograms", Proceeding of 2000 IEEE International Conference on Multimedia and Expo, vol. 1, Aug. 2, 2000, pp. 125-128.
U.S. Appl. No. 11/154,054—Office Action dated Dec. 30, 2008.
U.S. Appl. No. 11/154,053—Office Action dated Oct. 1, 2008.
U.S. Appl. No. 11/460,940—Notice of Allowance dated Dec. 15, 2008.
U.S. Appl. No. 11/202,903—Office Action dated Oct. 3, 2008.
U.S. Appl. No. 11/224,792—Office Action dated Nov. 10, 2008.
U.S. Appl. No. 11/371,466—Office Action dated Sep. 23, 2008.
PCT App. No. PCT/JP2008/064669—Invitation to Pay Additional Fees dated Sep. 29, 2008.
PCT App. No. PCT/JP2008/069815—Invitation to Pay Additional Fees dated Dec. 5, 2005.
International Application No. PCT/JP08/069815 International Search Report.
International Application No. PCT/JP08/072215 International Search Report.
International Application No. PCT/JP08/073898 International Search Report.
International Application No. PCT/JP08/073146 International Search Report.
International Application No. PCT/JP08/072715 International Search Report.
International Application No. PCT/JP08/073020 International Search Report.
International Application No. PCT/JP08/072001 International Search Report.
International Application No. PCT/JP04/013856 International Search Report.
PCT App. No. PCT/JP08/071909—Invitation to Pay Additional Fees dated Jan. 13, 2009.
U.S. Appl. No. 11/154,052—Office Action dated Apr. 27, 2009.
U.S. Appl. No. 11/154,053—Office Action dated Jan. 26, 2009.
U.S. Appl. No. 11/202,903—Office Action dated Feb. 5, 2009.
U.S. Appl. No. 11/224,792—Office Action dated Apr. 15, 2009.
U.S. Appl. No. 11/293,066—Office Action dated May 16, 2008.
U.S. Appl. No. 11/371,466—Office Action dated Apr. 14, 2009.
International Application No. PCT/JP08/071909 International Search Report.
PCT App. No. PCT/JP08/073020—Replacement Letter dated Apr. 21, 2009.
C. James Bartleson, Measures of Brightness and Lightness, Die Farbe 28 Nr3/6, 1980, 132-148.
U.S. Appl. No. 11/564,203—Notice of Allowance dated Apr. 2, 2010.
U.S. Appl. No. 11/154,052—Notice of Allowance dated May 21, 2010.
U.S. Appl. No. 11/154,053—Final Office Action dated Mar. 4, 2010.
U.S. Appl. No. 11/293,066—Non-Final Office Action dated Mar. 2, 2010.
U.S. Appl. No. 11/465,436—Notice of Allowance dated Apr. 20, 2010.
U.S. Appl. No. 11/224,792—Final Office Action dated Jun. 11, 2010.

* cited by examiner

METHODS AND SYSTEMS FOR SURROUND-SPECIFIC DISPLAY MODELING

FIELD OF THE INVENTION

Embodiments of the present invention comprise methods and systems for display modeling for adaptation to surround conditions.

BACKGROUND

LCDs suffer from elevated black level in dim viewing environments. Current techniques sense the ambient light and scale the backlight in accordance with the ambient level. These techniques typically improve the black level but are suboptimal as the selection of the backlight scaling is generally adhoc.

SUMMARY

Some embodiments of the present invention comprise methods and systems for generating and applying display models to adapt to display surround conditions.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise methods and systems for constructing and applying a family of display models which yield similar perceived display values in different ambient viewing environments. Application of this family of perceptual displays may result in a desired display output under different ambient light levels. In some embodiments, these methods and systems may be used to control the display process, e.g., backlight selection in an LCD.

In some embodiments of the present invention, the systems and methods use a specified display in a specified surround luminance to construct a reference for the perceptual model. Some embodiments use this reference, the perceptual model and a different surround environment to construct a display scenario having the same perceptual properties in the new surround as the reference display has in the reference surround. Thus, the perceptual model produces a display which will preserve one or more perceptual properties despite changes in the ambient surround. In some embodiments, the preserved perceptual properties may comprise black level, black level and white point, black level white point and intermediate gray levels, or other combinations of these properties or similar properties.

Figure 1A:
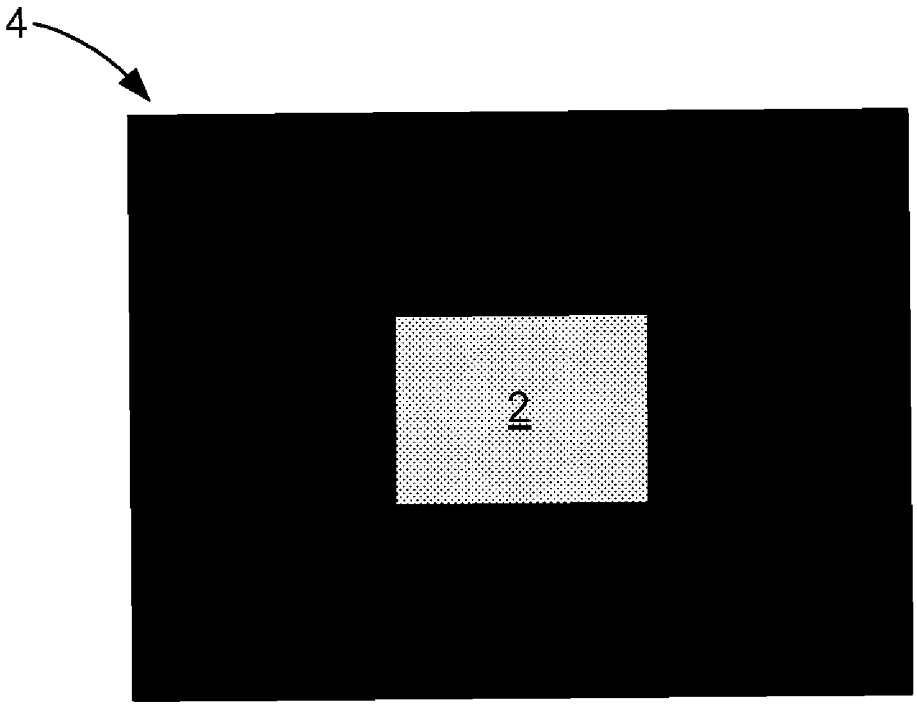
FIG. 1 is a figure showing how perceived brightness is surround-dependent.
Figure 1B:
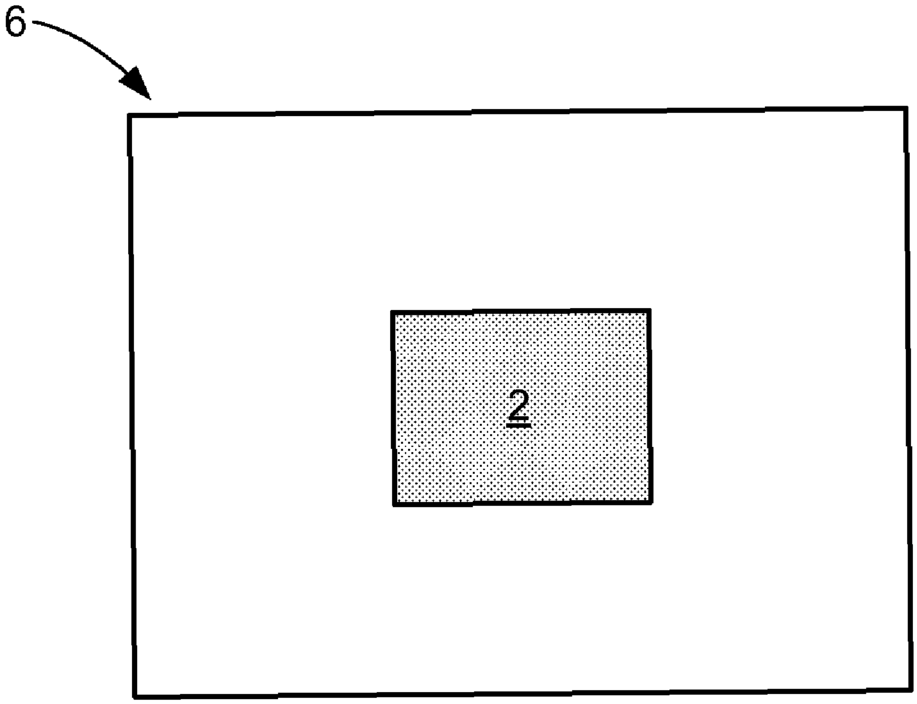

It is well known that the luminance of the surround of a display influences the perception of the image on the display. A simple example is illustrated in FIG. 1A and 1B where the appearance of the same display in different surround luminances is illustrated. In FIG. 1A, a flat grayscale image 2 is shown in a dark surround 4. In FIG. 1B, the same flat grayscale image 2 is shown in a light surround 6. Note how the grayscale image 2 appears brighter in the dark surround 4 of FIG. 1A than it does in the light surround 6 of FIG. 1B. This same phenomenon occurs in displayed images with varying surround conditions. The elevation of black level commonly seen in an LCD is illustrated by these figures.

The example shown in FIGS. 1A and 1B illustrates that the perception of the display output depends upon the viewing conditions. Embodiments of the present invention may use a model of brightness perception together with a measurement of the viewing conditions to maintain perceived image qualities such as black level. In some embodiments, desired qualities may comprise: perceived black level, perceived black level and white point or multiple perceived tonescale points.

Figure 2:
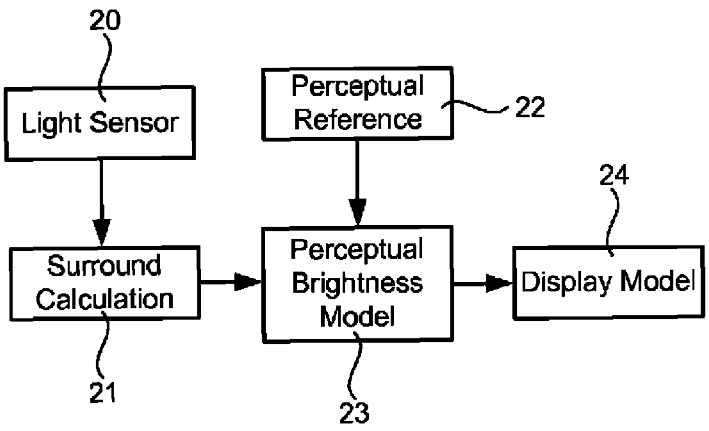
FIG. 2 is a chart showing an exemplary system comprising a perceptual brightness model, perceptual reference and a display model.
Figure 3:
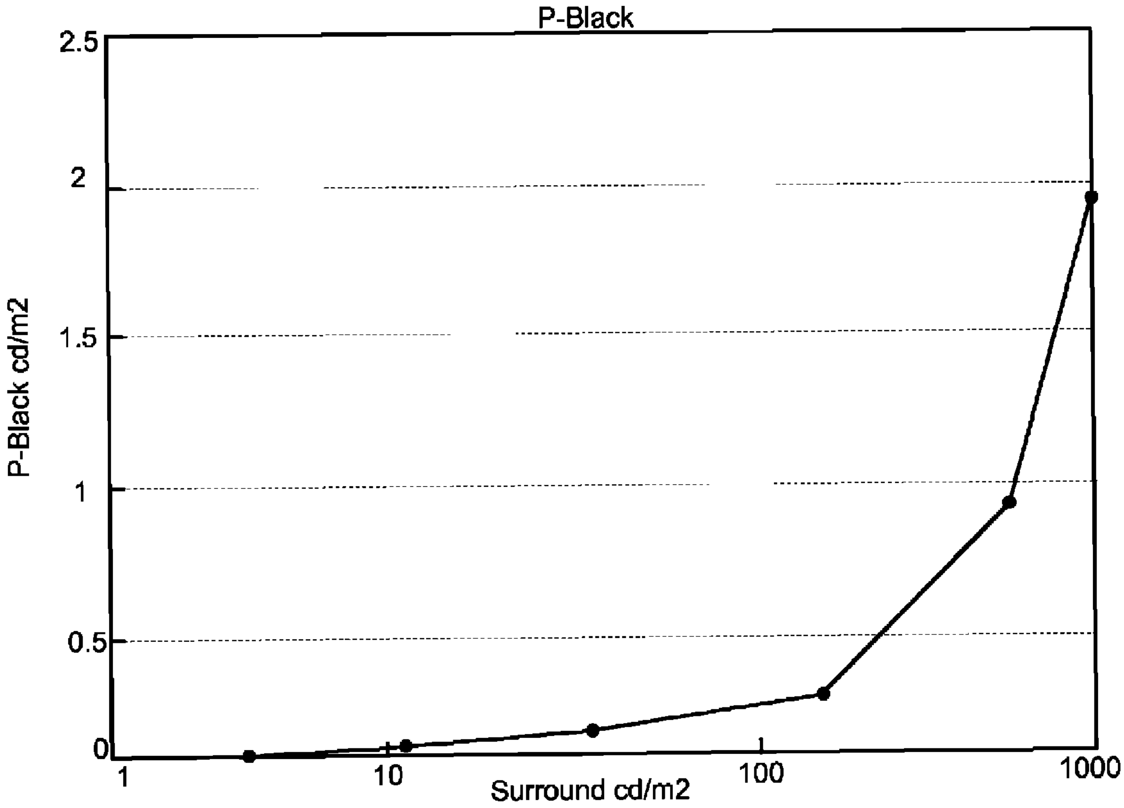
FIG. 3 is a graph showing perceptual black as a function of a surround characteristic.

FIG. 2 is a block diagram showing the elements of some embodiments of the present invention and their interaction. These embodiments comprise a light sensor 20 which may sense the ambient light conditions around a display. In some embodiments, light sensor 20 may sense light incident on the front of the display, light reflected off the background of the display, light incident on the side of the display or may perform another light measurement related to the ambient light in a display environment. In some embodiments, light sensor 20 may comprise multiple light sensors at various locations in proximity to the display. In some embodiments, light sensor 20 may detect light in the visible spectrum. In some embodiments, light sensor 20 may detect light outside the visible spectrum, which may be indicative of visible light characteristics in the surrounding environment. In some embodiments, light sensor 20 may detect light color characteristics. In some embodiments, light sensor 20 may input information into a surround calculation module 21.

Some embodiments of the present invention may comprise a surround calculation module 21. Surround light information may be sent from the light sensor to the surround calculation module 21. However, raw light sensor data received from the light sensors 20 may not be directly indicative of display surround conditions. Depending on the orientation and location of the sensor(s) 20, light sensor data may need to be processed. For example, a front-facing light sensor may detect light incident on the front of the display, but may not reflect information relative to the reflectivity of the background surrounding the display. Environmental factors, such as reflectivity of surrounding surfaces, proximity of surrounding surfaces, orientation of surrounding surfaces, texture of surrounding surfaces and other information may, in some embodiments, be input to the surround calculation module 21 to determine the characteristics of the surround environment. This information may be input manually by a user/installer or may be detected by automated sensing equipment. In some embodiments, only information received from the light sensor 20 is needed for the surround calculation 21.

In some exemplary embodiments, a front-facing sensor may be used for the light sensor 20. This sensor 20 may measure the light incident on the display, but not the surround directly. The surround luminance may differ from the sensed light due to the unknown wall reflectance. However, a reflectance can be assumed based on typical or conservative values. In some embodiments, this may be calibrated by using a typical room measuring the surround luminance and the ambient light sensed. In other embodiments, user adjustment of a reflectance factor may be used to more accurately predict surround surface reflectance. This reflectance information may be used to calculate surround conditions in surround calculation module 21.

In some exemplary embodiments, a rear facing sensor may be used for a light sensor 20 measures light reflected off wall toward rear of set. This sensor orientation can provide a direct measure of the surround luminance, but may suffer if the rear of the set is blocked such as when a display is wall mounted or in a cabinet. When the display is not blocked, these embodiments may omit surround calculation module 21 or calculation therein and use raw light sensor data to select a perceptual brightness model 23.

In some exemplary embodiments a rear-angled sensor may be used. A sensor in this orientation may measure light reflected from the side of the set, typically toward the back. These embodiments may reduce some of the problems of the rear facing sensors and typically work well for a wall mounted display.

In some exemplary embodiments, multiple sensors may be used. Some embodiments may comprise both a front sensor and a rear sensor. These embodiments have the benefit of not needing a reflection estimate when the rear sensor is receiving sufficient light. In some embodiments, when the rear sensor is blocked, e.g. the display is in a cabinet, the front facing sensor may be used.

Some embodiments of the present invention comprise a display model 24. A display model 24 may comprise a description of output luminance as a function of input code value supplied to the model display. In some embodiments, the basic model may comprise a Gain-Offset-Gamma (GoG) model to describe a display output. The form of this model in terms of luminance at black (B) and the luminance at white (W) is given in Equation 1 below. The value 2.2 is typically used for the parameter gamma.

*GoG* Display Model Equation 1

$$L(cv) = \left(\left(W^{\frac{1}{\gamma}} - B^{\frac{1}{\gamma}}\right) \cdot cv + B^{\frac{1}{\gamma}}\right)^{\gamma}$$

In some embodiments, this model can be additionally modified by specifying a tonescale in addition to the black and white levels. Some embodiments may comprise a tone scale T(cv) that may be applied to the code values prior to using the GoG model of Equation 1. Allowing the specification of a tone scale allows any display model with specified black and white points to be described through the GoG model. In some embodiments, the display model may be specified by two numbers, black and white luminances, and may be modified by additionally specifying a tonescale. The general form of this model is shown in Equation 2.

Tone scale modified *GoG* Display Model Equation 2

$$L(cv) = \left(\left(W^{\frac{1}{\gamma}} - B^{\frac{1}{\gamma}}\right) \cdot T(cv) + B^{\frac{1}{\gamma}}\right)^{\gamma}$$

Some embodiments of the present invention may comprise a perceptual reference 22. The perceptual reference 22 may specify a single surround and the desired display in this surround. This serves as an anchor with model displays in other surround luminances determined based upon the perceptual reference and reference surround. The perceptual reference 22 may be specified by giving a reference surround luminance and specifying the display model data (e.g., black level, white point, and/or tonescale) in this surround luminance ($Surround_R$). An exemplary perceptual reference is shown in Equation 3. This exemplary reference may be generated by measuring the tonescale of a desired display in a reference surround or by individually specifying parameters such as reference black and white levels. In some embodiments, these could be ideal values not simultaneously achievable by an actual display.

Perceptual Reference Equation 3

$$\underset{L_R(cv)}{Surround_R} = \left(\left(W_R^{\frac{1}{\gamma}} - B_R^{\frac{1}{\gamma}}\right) \cdot T_R(cv) + B_R^{\frac{1}{\gamma}}\right)^{\gamma}$$

Some embodiments of the present invention may comprise a perceptual brightness model 23. In some exemplary embodiments, three different levels of model may be defined according to the perceptual properties preserved in constructing the display model. In exemplary level 1, only the perceptual black level is preserved. Hence, the perceptual model consists of a luminance level for perceptual black as a function of surround luminance. In exemplary level 2, both the perceptual black level and perceptual white point are preserved. Hence, the perceptual model consists of a luminance level for perceptual black and a luminance level for perceptual white both as functions of surround luminance. In exemplary level 3, the perception of multiple gray levels may be preserved. Hence, in some embodiments, this perceptual model may describe luminance for perceptually equal luminance levels as a function of surround luminance.

Exemplary Model Level 1

In these embodiments, only the perceptual black level is considered. The perceptual model comprises a luminance level giving perceptual black for each surround luminance. Data from a psychophysical experiment on perceived black level as a function of surround luminance is shown in 3. This data indicates the display luminance below which a viewer perceives black as a function of the luminance of the display surround. As expected the luminance necessary to provide perceived black decreases as the surround luminance decreases.

In developing this exemplary display model, a fixed contrast ratio (CR) may be assumed. The display model may be determined entirely by the black level. In some embodiments, the backlight necessary to achieve perceived black, in a display with fixed contrast ratio (CR), which keeps a perceptual black, may be described by Equation 4.

Level 1 Reference Display — Equation 4

$$W(S) = CR \cdot B(S)$$

$$L(cv, S) = \left(B(S)^{\frac{1}{\gamma}} \cdot (CR - 1) \cdot cv + B(S)^{\frac{1}{\gamma}}\right)^{\gamma}$$

$$L(cv, S) = \frac{B(S)}{CR} \cdot \left(\left(1 - \frac{1}{CR}\right) \cdot cv + \frac{1}{CR}\right)^{\gamma}$$

The backlight level is the ratio of the surround dependent black level, B(S), and the fixed contrast ratio CR.

Exemplary Model Level 2

In these embodiments, both the perceptual black level and perceptual white point may be considered. The perceptual model may comprise luminance levels giving constant perceptual black and constant perceptual white point as a function of surround luminance. Unlike the perceptual black level, the perceptual white point may not be uniquely defined and may require the selection of a reference, e.g., specification of a surround and the luminance of perceptual white in this surround. For perceptual white, a surround and a luminance for use as a reference may be selected. A perceptual model may be used to determine the luminance level giving equal perceived brightness. This defines a perceptual white luminance as function of surround luminance. In some embodiments, the Bartleson model of perceived brightness may be used. This model is described in Bartleson, "Measures of Brightness and Lightness", Die Farbe 28 (1980); Nr 3/6, which is incorporated herein by reference. In some embodiments, an experimental determination of perceptual white as a function of surround luminance may be used. Given Black (S) and White(S), the reference display as a function of surround may be given by a GoG model with specified black and white levels.

Level 2 Reference Display — Equation 5

$$L(cv, S) = \left(\left(W(S)^{\frac{1}{\gamma}} - B(S)^{\frac{1}{\gamma}}\right) \cdot cv + B(S)^{\frac{1}{\gamma}}\right)^{\gamma}$$

Exemplary Model Level 3

In these exemplary embodiments, the brightness perception of all grey levels may be considered. The display model of exemplary model level 2 will may be modified by specifying a tone scale in addition to the black and white levels. The perceptual model may comprise luminance levels giving perceptual match to each grey level as perceived in a reference surround. In some embodiments, the Bartleson model may again be used to determine such a mapping. The Bartleson model for a display in surround S showing a luminance value L can be summarized by the form P(L,S) shown below Equation 6. The expressions a(S) and b(S) are expressed in detail in the incorporated Bartleson reference.

Form of Bartleson [1980] — Equation 6

$$P(L, S) = a(S) \cdot L^{\frac{1}{3}} + b(S)$$

Analysis of the Bartleson model determines criteria for luminance values. A brief illustration of this derivation is shown below. Given two surrounds S1 and S2, assume luminances (B1,W1) and (B2,W2) have been determined giving equal perceived black and white in the corresponding surrounds as in the exemplary model level 2 description above. In the notation below, black and white levels giving perceptual match in two surrounds are denoted by $B_1$ $B_2$ and $W_1$ $W_2$ respectively. It can be shown that intermediate luminance values are related by the following expression irrespective of the expressions for a(S) and b(S) in the model of Equation 6. The result relating luminance values is summarized in Equation 7. This relates the output at corresponding grey levels. A perceptual matching tonescale function can be derived based on the GoG model of Equation 2.

Condition for matching output of Bartleson [1980] model — Equation 7

$$L_2^{\frac{1}{3}} = \frac{W_2^{\frac{1}{3}} - B_2^{\frac{1}{3}}}{W_1^{\frac{1}{3}} - B_1^{\frac{1}{3}}} \cdot L_1^{\frac{1}{3}} + \frac{W_2^{\frac{1}{3}} - B_1^{\frac{1}{3}} - W_1^{\frac{1}{3}} \cdot B_2^{\frac{1}{3}}}{W_2^{\frac{1}{3}} - B_2^{\frac{1}{3}}}$$

$$L_2^{\frac{1}{3}} \approx \frac{W_2^{\frac{1}{3}}}{W_1^{\frac{1}{3}}} \cdot L_1^{\frac{1}{3}} + B_1^{\frac{1}{3}} - \frac{W_1^{\frac{1}{3}}}{W_2^{\frac{1}{3}}} \cdot B_2^{\frac{1}{3}}$$

Figure 4:
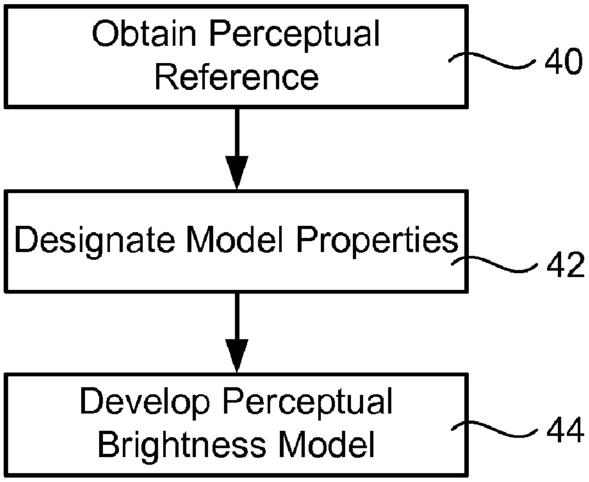
FIG. 4 is a chart showing an exemplary process for developing a perceptual brightness model.

Some embodiments of the present invention may be described with reference to FIG. 4. In these embodiments, a perceptual reference is obtained 40. The perceptual reference may be specified by a reference surround luminance and display model data (e.g., black level, white point, and/or tonescale) in this surround luminance. In some embodiments, this reference may be generated by measuring the tonescale of a desired display in a reference surround or by individually specifying parameters such as reference black and white levels. In these embodiments, model properties may also be designated 42. These properties may be designated by user input or may be otherwise selected at some time before creation of the model. In some embodiments, model properties may comprise a black level, a white point and/or a tonescale. In some embodiments, pre-set model property sets may be selected, e.g., model levels 1-3, described above.

These model properties and the perceptual reference may be used to develop a perceptual brightness model 44, which may be used to establish a relationship between surround conditions and display parameters, such as display backlight level, and other parameters. The perceptual brightness model 44 may also be used to establish a relationship between surround conditions and image parameters and values. This relationship may be represented as a tonescale or white point mapping. In some embodiments, the perceptual brightness model 44 may be coupled with surround conditions to generate a display model.

Figure 5:
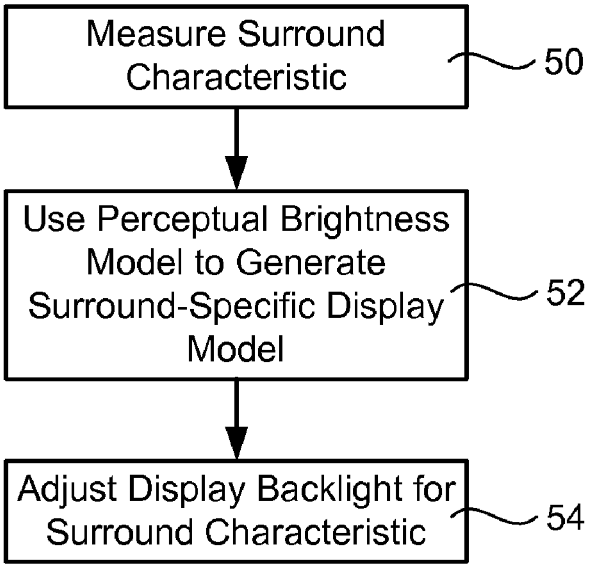
FIG. 5 is a chart showing an exemplary process for display adjustment with a surround-specific display model.

Some embodiments of the present invention may be described with reference to FIG. 5. In these embodiments, a sensor may be used to measure 50 a surround characteristic or condition. In some embodiments, the surround characteristic may be related to the intensity of light incident on a display. In some embodiments, the measured surround characteristic may be processed or used as input for a calculation that yields a more relevant surround characteristic.

The measured or calculated surround characteristic may then be input to a perceptual brightness model, which may be used to generate 52 a surround-specific display model. The display model may comprise data, which establishes a backlight illumination level corresponding to a black level appropriate for the measured surround characteristic. This display model data may then be used to adjust 54 a display backlight to produce the corresponding black level.

Figure 6:
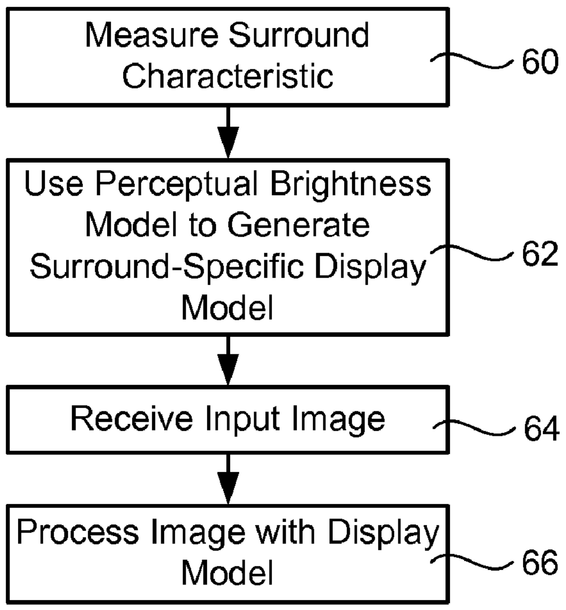
FIG. 6 is a chart showing an exemplary process for image processing with a surround-specific display model.

Some embodiments of the present invention may be described with reference to FIG. 6. In these embodiments, a sensor may be used to measure 60 a surround characteristic or condition. In some embodiments, the surround characteristic may be related to the intensity of light incident on a display. In some embodiments, the measured surround characteristic may be processed or used as input for a calculation that yields a more relevant surround characteristic.

The measured or calculated surround characteristic may then be input to a perceptual brightness model, which may be used to generate 62 a surround-specific display model. The display model may comprise data that relates an input image code value to a display output value. In some embodiments, the display model may relate an input code value to a white point. In some embodiments, the display model may comprise a tonescale operation.

In some embodiments, an input image may be received 64 and processed 66 with the display model. In some embodiments, this process may comprise mapping image data to a white point. In some embodiments, this process may comprise application of a tonescale operation to image data.

Figure 7:
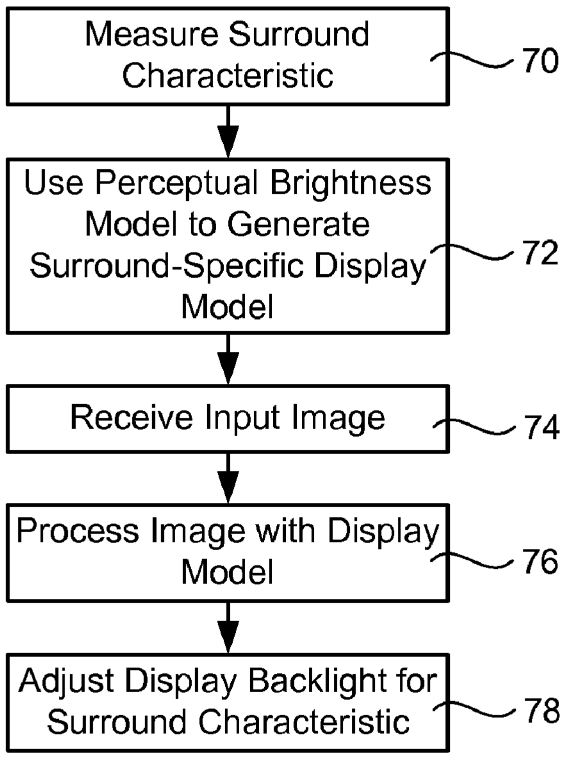
FIG. 7 is a chart showing an exemplary process for application of a surround-specific display model.

Some embodiments of the present invention may be described with reference to FIG. 7. In these embodiments, a sensor may be used to measure 70 a surround characteristic or condition. In some embodiments, the surround characteristic may be related to the intensity of light incident on a display. In some embodiments, the measured surround characteristic may be processed or used as input for a calculation that yields a more relevant surround characteristic.

The measured or calculated surround characteristic may then be input to a perceptual brightness model, which may be used to generate 72 a surround-specific display model. The display model may comprise data that relates an input image code value to a display output value. In some embodiments, the display model may relate an input code value to a white point. In some embodiments, the display model may comprise a tonescale operation. The display model may also comprise data, which establishes a backlight illumination level corresponding to a black level appropriate for the measured surround characteristic.

In some embodiments, an input image may be received 74 and processed 66 with the display model. In some embodiments, this process may comprise mapping image data to a white point. In some embodiments, this process may comprise application of a tonescale operation to image data. The display model data may also be used to adjust 78 a display backlight to produce a black level identified by the display model.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for generating a surround-characteristic-specific display model, said method comprising:

a) receiving a surround light characteristic;

b) receiving perceptual reference data comprising at least one of a black point, a white point, and a tone scale;

c) receiving model property data;

d) generating a perceptual brightness model based on said perceptual reference data and said model property data, said perceptual brightness model relating said perceptual reference data as a function of surround luminance; and e) generating a display model based on said perceptual brightness model, said display model relating backlight luminance of a display as a function of said surround light characteristic; and f) using said display model to drive a backlight of a display.

2. A method as described in claim 1 wherein said surround light characteristic comprises a light intensity incident on a display.

3. A method as described in claim 1 wherein said surround light characteristic is calculated from a light intensity measurement.

4. A method as described in claim 1 wherein said perceptual reference data comprises display model data for a specific reference surround luminance value.

5. A method as described in claim 1 wherein said model property data indicates at least one property of a perceptual brightness model.

6. A method as described in claim 1 wherein said model property data indicates whether said perceptual brightness model comprises elements related to a black level, a white point and a tonescale process.

7. A method as described in claim 1 wherein said display model comprises elements related to at least one of a black level, a white point and a tonescale process.

8. A method as described in claim 1 wherein said display model comprises data for configuring a display backlight illumination level.

9. A method as described in claim 1 wherein said display model comprises data for adjusting an image value to a white point.

10. A method as described in claim 1 wherein said display model comprises a tonescale operation for adjusting a plurality of image values.

11. A system for generating a surround-characteristic-specific display model, said system comprising:

a) a mechanical light receptor for receiving a surround light characteristic related to a display;

b) a reference receiver for receiving perceptual reference data comprising at least one of a black point, a white point, and a tone scale;

c) a model receiver for receiving model property data;

d) a perceptual model generator for generating a perceptual brightness model based on said perceptual reference data and said model property data, said perceptual brightness model relating said perceptual reference data as a function of surround luminance; and e) a display model generator for generating a display model based on said perceptual brightness model, said display model relating backlight luminance of a display as a function of said surround light characteristic.

12. A method as described in claim 11 wherein said mechanical light receptor is a light sensor capable of measuring a light intensity incident on said display.

13. A method as described in claim 11 wherein said mechanical light receptor receives a surround light characteristic calculated from a light intensity measurement.

14. A method as described in claim 11 wherein said perceptual reference data comprises display model data for a specific reference surround luminance value.

15. A method as described in claim 11 wherein said perceptual reference data comprises at least one of a black level, a white point and a tonescale process for a specific reference surround luminance value.

16. A method as described in claim 11 wherein said model property data indicates at least one property of a perceptual brightness model.

17. A method as described in claim 11 wherein said display model comprises elements related to at least one of a black level, a white point and a tonescale process.

18. A method as described in claim 11 wherein said display model comprises data for configuring a display backlight illumination level.

* * * * *